United States Patent [19]

Tremblay et al.

[11] Patent Number: 4,691,988
[45] Date of Patent: Sep. 8, 1987

[54] PULLING EYE ASSEMBLY

[75] Inventors: Paul Tremblay, Pointe-aux Trembles; Georges Tzabanakis, Montreal, both of Canada

[73] Assignee: Tekna Recherche & Developpment Inc., Canada

[21] Appl. No.: 802,046

[22] Filed: Nov. 26, 1985

[51] Int. Cl.⁴ .............................................. G02B 6/44
[52] U.S. Cl. .................................. 350/96.23; 174/79; 350/96.20
[58] Field of Search ..................... 350/96.20, 96.23; 254/134.3 R; 174/79; 403/78, 2

[56] References Cited

U.S. PATENT DOCUMENTS

| | | |
|---|---|---|
| 1,334,154 | 3/1920 | Harrisson . |
| 1,829,964 | 11/1931 | Randall ........................... 403/78 X |
| 2,164,426 | 7/1939 | Renfroe ............................. 403/78 |
| 2,339,671 | 1/1944 | Bergman ............................ 24/123 |
| 2,701,132 | 2/1955 | Arnold .............................. 259/144 |
| 2,775,747 | 12/1956 | Reischer et al. ................ 174/79 X |
| 2,811,378 | 10/1957 | Kalista ............................... 287/91 |
| 3,306,970 | 2/1967 | Kowalski ........................... 174/79 |
| 3,490,799 | 1/1970 | Shreeve ............................. 287/91 |
| 3,544,142 | 12/1970 | Moss, Jr. ........................... 287/91 |
| 3,707,303 | 12/1972 | Petri ................................ 287/20.3 |
| 3,809,366 | 5/1974 | Crees .......................... 254/134.3 FT |
| 4,016,796 | 4/1977 | Brannan ............................. 403/2 X |
| 4,195,798 | 4/1980 | Costantino et al. ............. 403/78 X |
| 4,330,926 | 5/1982 | McCall .............................. 403/2 X |
| 4,337,923 | 6/1982 | Smith ......................... 254/134.3 FT |
| 4,432,663 | 2/1984 | Lasak et al. ...................... 403/275 |

Primary Examiner—John Lee
Assistant Examiner—John Ngo
Attorney, Agent, or Firm—Steele, Gould & Fried

[57] ABSTRACT

An articulated pulling eye assembly for attaching the terminal end of a communication optic fiber carrying cable to a pulling device; comprises an elongated body in which is mounted a rupturable tension responsive member for freeing the cable from the pulling device once the tension exerted by the pulling device exceeds a predetermined value; and, a swivel member mounted at the opposite end of the elongated body for freeing the cable from rotational loads which may also be applied during the pulling operation.

12 Claims, 5 Drawing Figures

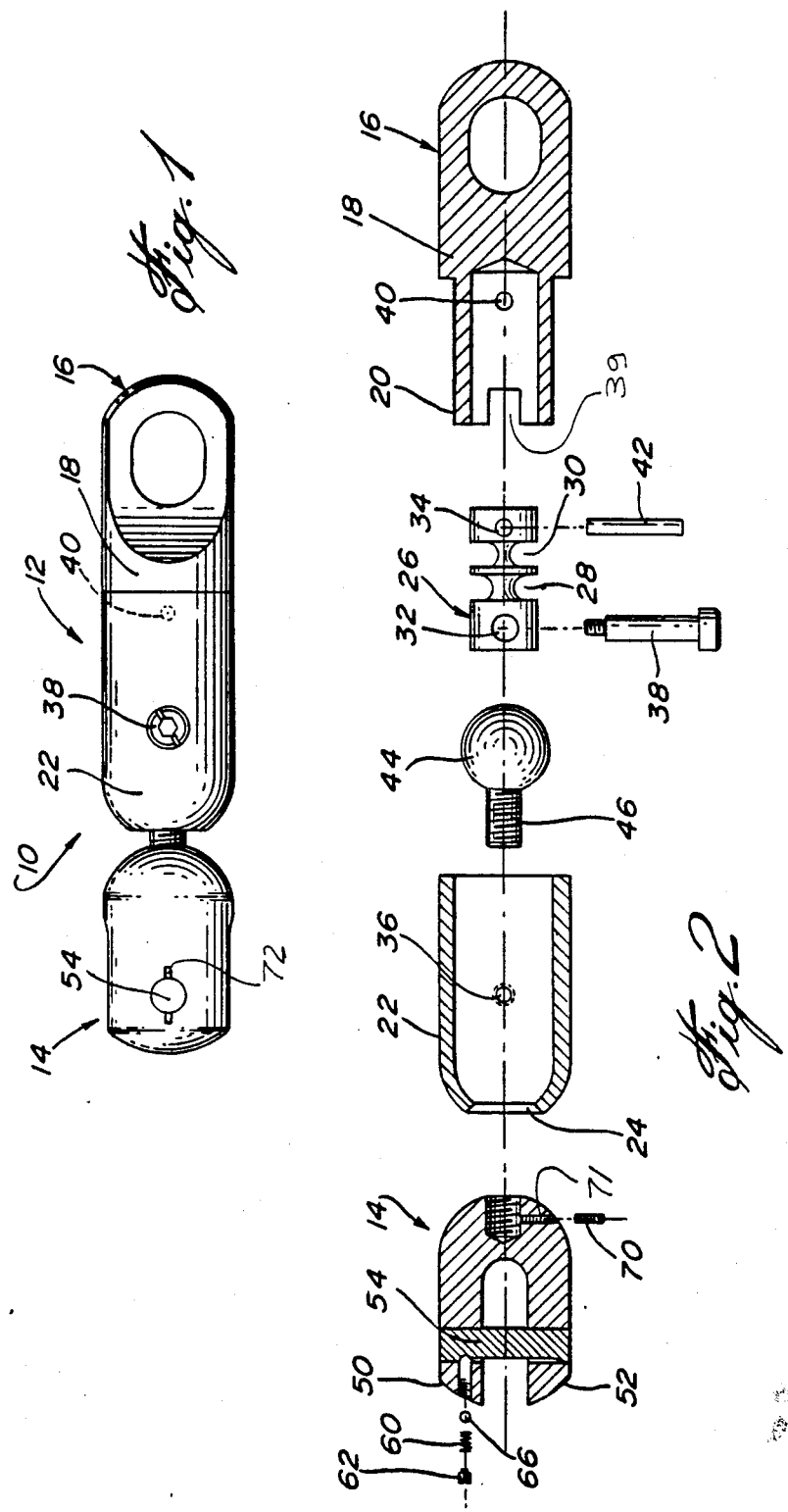

PULLING EYE ASSEMBLY

FIELD OF THE INVENTION

The present invention relates to a pulling eye assembly for attachment to the terminal end of a communication optic fiber carrying cable which is subject to tensional and rotational loads as the cable is pulled by a pulling device.

BACKGROUND OF THE INVENTION

Communication cables formed of fiber optics are pulled through trunking systems for installation. During the pulling operation the cables are subjected to rotational and tensional loads which are caused by resistance created by the configuration of the trunking path or by obstructions therein. An excessive pulling force will result in an elongation of the cable causing an excess in the admissible tension which can be taken by the fiber optics in the cable. This pulling force may also be caused by a torsion of the cable as the latter is being pulled.

SUMMARY OF THE INVENTION

It is an object of the present invention to provide, at the terminal end of a communication fiber optic carrying cable, a pulling eye assembly that includes means which will eliminate the torsional and tensional loads applied to the cable if a predetermined pulling force is exceeded.

The present invention, therefore, relates to a pulling eye assembly for attachment to the terminal end of a communication optic fiber carrying cable which comprises: an elongated body; attachment means at one end of the body for attaching the cable to a pulling device; swivel means mounted at the opposite end of the body for freeing the cable from rotational loads; and rupturable tension responsive means in the body for freeing the cable from the pulling device when the tension exerted by the pulling device exceeds a predetermined value, the latter being less than that which is required to damage optic fibers in the cable.

In a preferred embodiment of the invention, the tension responsive means consist of a shear pin having a pair of longitudinally spaced circumferential grooves. The diameter of the pin in the grooves is such as to correspond to the predetermined rupture value to avoid damage to the cable. The provision of a double groove ensures rupture should one of the groove fail to break at the said value.

In another embodiment of the invention, the swivel means consists of a clevis joint having a pair of branches through which extends transversely a cross pin. The cross pin has a cylindrical shape with a flat surface which is engaged by spring urged bead means. Such arrangement allows easy and quick manual connection to the cable without the use of tools.

Other objects and further scope of applicability of the present invention will become apparent from the detailed description given hereinafter. It should be understood, however, that this detailed description, while indicating preferred embodiments of the invention, is given by way of illustration only since various changes and modifications within the spirit and the scope of the invention will become to those skill in the art.

BRIEF DESCRIPTION OF THE DRAWINGS

FIG. 1 is an elevation of a pulling eye assembly made in accordance with the present invention;

FIG. 2 is an exploded view of the pulling eye assembly shown in FIG. 1;

DETAILED OF THE PREFERRED EMBODIMENTS

Figure 3:
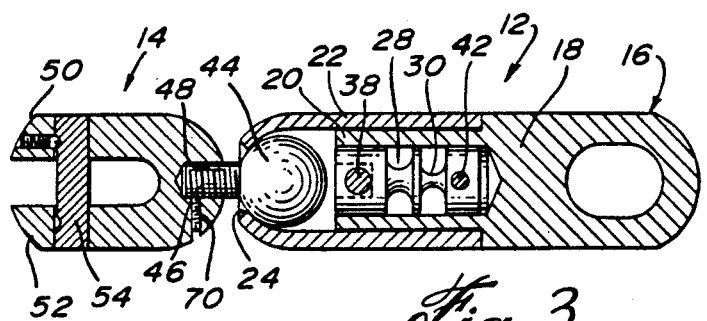
FIG. 3 is a longitudinal cross-sectional view in elevation of the assembled pulling eye device of FIG. 1.

Referring to FIGS. 1 and 2 there is shown a pulling eye assembly, generally denoted 10, which is adapted to be attached to the terminal end of a communication fiber optic carrying cable (not shown). Such terminal end of a communication cable is provided also with a pulling eye to which this assembly is attached.

One example of such a cable with a pulling eye is found described in U.S. Pat. No. 4,337,923 issued July 6, 1982 to J. A. Smith. The pulling eye assembly mainly comprises an elongated body 12 and a clevis joint 14.

The elongated body 12 is formed of a first section 16 that includes a pulling eye extremity 18 and a hollow tubular portion 20. The latter is received within a tubular sleeve member 22 having a narrow opening 24 at one end thereof.

A shear pin 26 having a cylindrical shape is received within the hollow portion 20 of member 16. The shear pin includes a pair of grooves 28 and 30, the function of which will be described further hereinbelow. The shear pin also includes two transverse openings 32 and 34. Once received in the hollow portion 20, the shear pin has its transverse opening 32 aligned with a pair of diametrically opposed holes 36 in the sleeve member 22 so that a pin 38 may extend through both holes 36 and the transverse opening 32 of the cross pin thereby securing the shear pin to the sleeve member 22. One of the openings 36 is threaded so as to engage the threaded end of pin 38. The tubular extension 20 of the member 16 has a pair of diametrically opposite rectangular recesses 39 allowing pin 38 to reach the opposite holes 36 of the sleeve while not being connected to extension 20. The latter has also a pair of diametrically opposite holes 40 with which is axially aligned the opening 34 of the shear pin so that a connecting pin 42 may extend through the openings of the holes to secure the shear pin to the sleeve member 16.

The provision of a double pair of grooves 28 and 30 ensures that whenever the pulling force exerted on the pulling assembly exceeds a given value, which is set to be less than that is required to damage the fiber optics of a communication cable, the shear pin will rupture at the grooves. It has been found that the provision of two successive grooves insures that breakage will occur in the event that the material composition at one of the groove or its diameter size does not correspond to the exact value of the rupture limit. Therefore, whenever such value is exceeded, the shear pin will break thus separating the sleeve member 22 from the body extension 16, one part of the shear pin remaining with the sleeve member 22 while the other part remains with the member 16. The pair of diametrically opposite rectangular recesses 39 at the extremity of extension 20 to allow pin 38 to move with sleeve 22.

Figure 4:
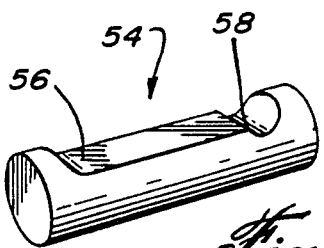
FIG. 4 is a perspective view of a cross pin used in the swivel means.
Figure 5:
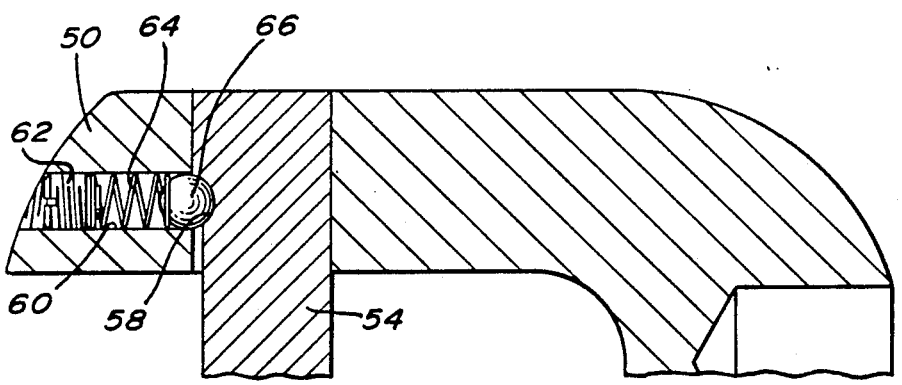
FIG. 5 is an enlarged sectional view of one branch of the clevis joint showing the spring urged bead means engaged in the cross pin.

Referring to FIGS. 3, 4 and 5, the clevis joint 14 of the pulling eye assembly 10 forms part of a swivel arrangement of the pulling eye assembly which serves to eliminate rotational loads exerted on the cable. The clevis joint 14 is attached to the elongated body 12 by means of a connecting member that includes a spherical portion 44 and a threaded portion 46 that engages a threaded bore 48 in the clevis joint. The clevis joint 14 and elongated body 12 formed an articulated assembly. The threaded portion 46 protrudes opening 24 of the sleeve member 22. The other end of the clevis joint is formed of a pair branches 50 and 52 that defines a pair of aligned circular openings to receive a cross pin 54. The latter has a cylindrical shape whith a flat surface 56 that includes at one end thereof a curved recess 58. Branch 50 includes an opening 60 (see FIG. 5) in which are inserted a screw 62, a spring 64 and a bead 66. The bead 66 is biased by spring 64 forced by screw 62 so as to rest into the recess 58 of the cross pin 54. Once engaged in the recess, the bead and recess cooperate to prevent retracting of the pin. Therefore, the spring biased bead and the groove form a detent means which hold securely pin 54 in closed position without any additional pins or clips. This greatly simplifies the manual connection of the swivel to a cable.

Whenever the pulling force exerted between the clevis joint and the elongated body 12 is large, there is a possibility that the spherical head 44 may tightly abut the adjacent curved end wall of sleeve 22 resulting in an unwanted unscrewing action of the threaded portion 46 from its threaded bore 48. To prevent this, a small pin 70 is inserted through a pierced hole 71 in the clevis body into the threaded member 46 to lock them together. To facilitate removal of the pin 54 from the branches, a fingernail inserting recess 72 is provided.

Although the invention has been described with respect to specific forms of the invention, it is evident that it may be refined and modified in various ways. It is, therefore, wished to have it understood that the present invention should not be limited in interpretation except by the terms of the following claims.

What is claimed is:

1. An articulatable pulling eye assembly for attachment to a terminal end of a communication optic fiber carrying cable which is subjected to tensional and rotational loads as said cable is pulled along trunking paths and the like by a pulling device, said assembly comprising:
   an elongated body;
   attachment means at one end of said body for attaching said assembly to said pulling device;
   swivel means mounted at the opposite end of said body;
   cable engaging means on said swivel means, an engaged cable being thereby freed from rotational loads transmitted by said pulling device through said body;
   load bearing link means connecting said attachment means and said swivel means;
   at least two independently rupturable tension responsive means in said link means for effecting separation of said cable from said pulling device when the tension exerted by said pulling device exceeds a predetermined value, said value being less than that required to damage optic fibers in said cable.

2. An assembly as defined in claim 1, wherein said tension responsive means comprises a shear pin having a pair of longitudinally spaced circumferential grooves.

3. An assembly as defined in claim 2, wherein said attachment means comprises a tubular extension fitting within said elongated body;
   first fastening means for connecting said shear pin to said tubular extension; and
   second fastening means for securing said shear pin to said elongated body.

4. An assembly as defined in claim 3, wherein said tubular extension includes slot means, at one end thereof, allowing passage of said second fastening means through said tubular extension and being so arranged as to not impinge the freeing of said elongated body when said predetermined value is exceeded.

5. An assembly as defined in claim 1, wherein said elongated body is cylindrically shaped having, at said opposite end thereof, a narrow opening; said swivel means including a first member having a spherical portion enclosed in said elongated body and an extension member, integral with said spherical portion, protruding through said narrow opening for connection to a clevis joint.

6. An assembly as defined in claim 1, further comprising:
   a clevis joint mounted to said opposite end of said body and including: a forked member having first and second parallel branches, each including an opening; a cross pin slidably mounted in said opening and adapted to slide across said branches in extended or retracted positions for closing and opening said clevis joint; and detent means mounted in said forked member for holding said cross pin in extended position against an undesired retraction of said cross pin, said detent means releasing said cross pin from said extended position when a predetermined retractive force is applied to said cross pin.

7. An assembly as defined in claim 6, further comprising a member having a first portion received in said opposite end of said elongated body and a second portion engaged in said forked member.

8. An assembly as defined in claim 7, wherein said portion of said member in said elongated body is spherical and said second portion is threadedly engaged in said forked member.

9. An assembly as defined in claim 8, further comprising locking means extending through said forked member and received in said second portion to prevent disengagement of said second portion from said forked member under relative rotational load conditions between said body and said swivel means.

10. An assembly as defined in claim 6, comprising: spring urged bead means partially projecting in said opening of said first branch; and, said cross pin including a flat surface and a bead retention recess on said surface for cooperatively interfitting with said spring urged bead means.

11. An assembly as defined in claim 10, wherein said spring urged bead means comprises a ball biased by a helicoidal spring, said ball and said spring being mounted in a bore defined in said first branch, said bore having one end communicating with said opening.

12. An assembly as defined in claim 11, wherein said bore is closed, at the opposite end thereof, by an adjusting screw.

* * * * *